United States Patent [19]

Herzig et al.

[11] Patent Number: 5,348,582
[45] Date of Patent: Sep. 20, 1994

[54] MINERAL BUILDING MATERIALS WITH ADDITIVES

[75] Inventors: Joachim Herzig, Leichlingen; Kurt Bredtmann, Leverkusen; Birger Knickel, Odenthal; Cornelia Dörzbach-Lange, Kürten-Bechen, all of Fed. Rep. of Germany

[73] Assignee: Bayer AG, Leverkusen, Fed. Rep. of Germany

[21] Appl. No.: 63,716

[22] Filed: May 20, 1993

[30] Foreign Application Priority Data

Jun. 2, 1992 [DE] Fed. Rep. of Germany ....... 4218183

[51] Int. Cl.$^5$ ...................... C04B 24/00; C04B 24/22
[52] U.S. Cl. ..................... 106/696; 106/724; 106/725; 106/727; 106/730; 106/790; 106/802; 106/822; 106/823
[58] Field of Search ............... 106/724, 725, 727, 730, 106/696, 774, 790, 794, 795, 802, 819, 822, 823; C04B 24/00, 24/22

[56] References Cited

U.S. PATENT DOCUMENTS

| B 465,955 | 2/1976 | Schaupp | 260/37 R |
|---|---|---|---|
| 3,184,493 | 5/1965 | Kunze et al. | 260/453 |
| 3,686,133 | 8/1972 | Hattori et al. | 252/354 |
| 3,997,502 | 12/1976 | Schaupp | 260/37 R |
| 4,065,318 | 12/1977 | Detroit et al. | 106/90 |
| 4,079,040 | 3/1978 | Ribka et al. | 260/49 |
| 4,239,550 | 12/1980 | Köhler | 106/314 |
| 4,333,917 | 6/1982 | Dörr et al. | 423/522 |
| 4,441,929 | 4/1984 | Marcellis et al. | 106/725 |
| 4,592,940 | 6/1986 | Blyth et al. | 428/96 |
| 4,623,682 | 11/1986 | Nicholson et al. | 106/725 |
| 5,092,934 | 3/1992 | Furuhashi et al. | 106/727 |
| 5,153,299 | 10/1992 | Kawamura et al. | 528/149 |
| 5,233,012 | 8/1993 | Kawamura et al. | 528/161 |

FOREIGN PATENT DOCUMENTS

| 1238831 | 4/1967 | Fed. Rep. of Germany . |
|---|---|---|
| 1265022 | 3/1968 | Fed. Rep. of Germany . |
| 1960616 | 6/1971 | Fed. Rep. of Germany . |
| 2050084 | 4/1972 | Fed. Rep. of Germany . |
| 2421222 | 11/1975 | Fed. Rep. of Germany . |
| 2809685 | 9/1979 | Fed. Rep. of Germany . |
| 3204326 | 9/1982 | Fed. Rep. of Germany . |
| 4027667 | 3/1991 | Fed. Rep. of Germany . |
| 2228041 | 11/1974 | France . |
| 0701973 | 1/1973 | U.S.S.R. . |
| 0586781 | 3/1978 | U.S.S.R. . |

OTHER PUBLICATIONS

Abstract (from "Orbit") of German Patent DE-AS 1 238 831 (Jan. 1968).
Abstract (from "Orbit") of German Patent DE-OS 2 809 685 (Jan. 29, 1981).
Abstract (from "Orbit") of German Patent DE-OS 3 204 326 (Sep. 2, 1982).
Abstract (from "Orbit") of German Patent DE-OS 1 960 616 (Mar. 7, 1974).
Abstract (from "Orbit") of German Patent DE-OS 2 050 084 (Oct. 13, 1970).
Abstract (from "Orbit") of German Patent DE-OS 1 265 022 (Dec. 12, 1960).

Primary Examiner—Mark L. Bell
Assistant Examiner—Paul Marcantoni
Attorney, Agent, or Firm—Connolly & Hutz

[57] ABSTRACT

The invention relates to mineral building materials which contain binders, optionally aggregates and at least one additive, characterized in that the additives used are compounds which are condensation products of substituted or unsubstituted diphenyl sulphones, formaldehyde and compounds from the group consisting of mononuclear or polynuclear, substituted or unsubstituted aromatic compounds, acid amides, urea, urea derivatives, substituted or unsubstituted aromatic ethers and imines.

3 Claims, No Drawings

MINERAL BUILDING MATERIALS WITH ADDITIVES

The invention relates to mineral building materials which contain binders such as e.g. cement or anhydrite, optionally aggregates such as e.g. sand, and other additives.

In general, in the manufacture of parts such as floor slabs, wall tiles, walling, ceilings etc., inorganic binders, such as anhydrite (natural and synthetic), plaster and cement, in some cases without aggregates but normally in conjunction with aggregates such as sand, pebbles, perlite, pumice and foamed plastic beads, are mixed with water—if appropriate using additives such as air-entraining agents or liquefiers—and applied in this form. To obtain good properties of the parts manufactured with this mortar, care must be taken here to work with a snail water-binder factor (WBF), i.e. with as little water as possible relative to the binder used. Often, however, this makes the mortar viscous. If the water content is reduced further, the mortar loses its plasticity and hence its good compressibility. If high- quality prefabricated parts are then to be manufactured from such a mortar, it is necessary to carry out intensive mechanical compaction by means of vibration and/or pressing. As even this is not sufficient for many purposes, increased amounts of binder often to be used in order to achieve the desired properties such as high strengths, quick setting or early removal of formwork, impermeability etc.

All the above-mentioned measures are associated with increased effort and hence also with higher costs. These measures are therefore often dispensed with and an easier workability of the mortar is forcibly achieved by increasing the water-binder factor, frequently resulting in qualitative defects or damage in the prefabricated parts manufactured in this way.

An attempt has therefore been made to improve the work-ability of mortars by means of chemical additives.

Using chemical additives having a plasticizing or liquefying action, which disperse the binder particles even in small amounts, it is possible to achieve a considerably improved workability of the mixture of building materials without altering the water/binder ratio, or to achieve the same workability with less water. In both cases, on average, a lower porosity is obtained, coupled with increased strength.

Furthermore, as a consequence of their surface activity, the plasticizing or liquefying additives also have the effect of dispersing the agglomerates of fine particles which are always present in the binder. This leads to a better and more homogeneous distribution of the binder in the mixture of building materials and thereby to a better action of the binder and hence a higher strength.

There is not a marked distinction between plasticizing and liquefying substances. By using plasticizing additives, it is generally possible to reduce the amount of water by about 15%. With liquefiers, on the other hand, the amount of water is frequently reduced by up to 30% and the strength increased by 40 to 50%.

Thus it is known to use liquefiers for inorganic binders such as cement, plaster or anhydrite, said liquefiers being, almost without exception, surface-active substances such as e.g. melaminesulphonates, alkylarylsulphonates, ethylene oxide addition products, alkylphenol polyglycol ethers, ligninsulphonates etc., and combinations thereof. These products are normally used in amounts of 0.01 to 0.5% relative to the binder. With an optimal dose, the water saving or increase in fluidity is scarcely more than 10 to 20%. Larger amounts of additive do not substantially enhance the liquefying effect but, almost without exception, have a considerable adverse effect on the properties of the mortar, especially a lowering of the setting rate, raising of the air void content and lowering of the strengths.

German Offenlegungsschriften 1 671 017 and 3 609 802 propose the addition of modified aminotriazine resins to inorganic binders. These additives give the building material good adhesive, tensile and compressive strengths and surface quality. However, these products have the associated disadvantage that, with a low dose of the additive, sticky mixtures are obtained which have a poor workability and an excessively short working time, or that, with a higher dose, apart from economic aspects, mixtures are obtained in which binder and aggregate separate and layers of slurry form on the surface.

It is also known to use ligninsulphonates (DE-OS 2 713 898, DE-OS 3 204 326) and lignin/formaldehyde condensation products (U.S. Pat. No. 3,184,493, DE-OS 2 803 923, EP 3 362) as well as naphthalenesulphonates (DE-AS 1 238 831, DE-OS 2 007 603, DE-OS 2 809 685) as plasticizers and/or liquefiers for mixtures of building materials.

The activity of liquefiers based on ligninsulphonates is lower than that of melamine resin condensation products. Although a good liquefying action is found with higher doses, the mortar composition "bleeds" and the setting times become too long. Mixtures of different ligninsulphonates with other chemical substances, such as condensed aromatics, heterocycles and amino compounds, moderate the undesired effects but cannot eliminate them. Non-ionic additives of the polyether type are described in DE-OS 2 050 084. DE-OS 1 265 022 recommends the use of non-ionic wetting agents with organic amino bases and organic acids containing hydroxyl groups.

DE-OS 2 322 707 relates to mortars which contain inorganic binders, optionally aggregates and additives, the additives used being formaldehyde condensation products with sulphonated aromatic ethers and/or imines and/or sulphones.

Such additives have a small plasticizing/liquefying action and must therefore be used in relatively high doses in order to achieve the desired effects, making their use uneconomic. Added to this is the fact that the mortar mixtures have a strong tendency to "bleed" at the high doses required, or to stick in the case of non-fluid mixtures.

The object was therefore to provide building materials, based on mineral inorganic binders, in which the amount of water required to attain the working consistency is small, the strength of the set building material is high and at the same time the workability of the wet building material is good, without the setting times being greatly delayed.

This object could be achieved with the mineral building materials according to the invention.

The invention provides mineral building materials which contain binders, optionally aggregates and at least one additive, characterized in that the additives used are compounds which are condensation products of substituted or unsubstituted diphenyl sulphones, formaldehyde and compounds from the group consisting of mononuclear or polynuclear, substituted or unsubstituted aromatic compounds, acid amides, urea, urea derivatives, substituted or unsubstituted aromatic ethers and imines.

Preferred mineral building materials are those in which the additives are condensation products of diphenyl sulphones of formula I:

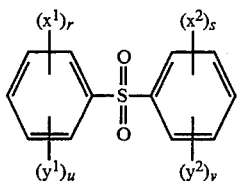

where
$X^1$ and $X^2$ are H, OH, substituted or unsubstituted $C_1$–$C_6$-alkyl, $C_1$–$C_6$-alkoxy or halogen, wherein $X^1$ and $X^2$ are identical or different,
$Y^1$ and $Y^2$ are H, $(CH_2)_nSO_3Me$ or $SO_3Me$ [where n=1–5 and Me=alkali metal, substituted ammonium or unsubstituted ammonium], wherein $Y^1$ and $Y^2$ are identical or different,
r and s independently of one another are 0 to 2 and
u and v independently of one another are 0 or 1,
and compounds of formulae II to V:

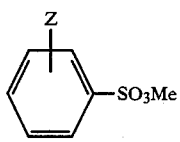

Me = alkali metal, substituted ammonium or unsubstituted ammonium
Z = H, OH, or $C_1$—$C_4$-alkyl

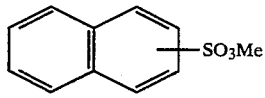

Me = alkali metal, substituted ammonium or unsubstituted ammonium $$HRN-\underset{\underset{O}{\|}}{C}-NRH \quad IV$$

R = H, or $C_1$—$C_4$-alkyl

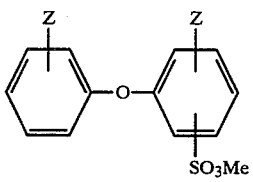

Me = alkali metal, substituted ammonium or unsubstituted ammonium
Z = H, OH, $C_1$—$C_4$-alkyl and formaldehyde.

Particularly preferred mineral building materials are those in which the additives are condensation products of diphenyl sulphones and compounds from the group consisting of mononuclear or polynuclear, substituted or unsubstituted aromatic compounds, acid amides, urea, urea derivatives, substituted or unsubstituted aromatic ethers and imines in a molar ratio of 1:5 to 5:1, with formaldehyde in a molar ratio of 1:0.8 to 1:2.0, based on the component present in excess.

It is preferable to use condensation products of diphenyl sulphones of formula I
where
$X^1$ and $X^2$=OH,
r and s=1,
$Y^1$ and $Y^2$=$SO_3Me$ or $(CH_2)_nSO_3Me$ [where Me=alkali metal and n=1] and
u and v=0 or 1,
and compounds of formulae VI to IX:

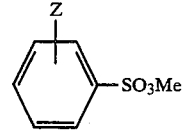

Me = alkali metal
Z = H, OH, or $C_1$—$C_4$-alkyl

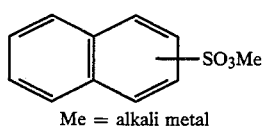

Me = alkali metal

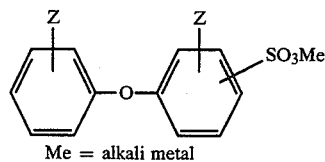

Me = alkali metal
Z = H, OH, or $C_1$—$C_4$-alkyl $$H_2N-\underset{\underset{O}{\|}}{C}-NH_2 \quad IX$$

and formaldehyde.

The mineral building materials are used for the manufacture of prefabricated parts such as floor slabs, wall tiles, walling, ceilings etc.

The additives can be added to the mineral building material in powder form or in solution.

A measure of the activity of additives, in the case of earth-moist non-fluid building materials, is taken to be the manipulability in use, e.g. the mechanical mobility, stickiness and tendency of the constituents to separate.

The air void content according to DIN 18555/P2 is also a measurable variable for the workability of earth-moist non-fluid building materials. The workability generally improves and the stickiness of the building material decreases as the air void content increases. However, the compressive strength generally falls with increasing air void content. The mortar should therefore still have sufficient strength even when the air void content is increased.

Furthermore, the use of an additive must not cause sedimentation or "bleeding" of the building material in the initial phase or unacceptable shrinking or swelling behaviour according to DIN 52450 during or after setting.

In the case of fluid building materials, the building material should be as self-levelling as possible and flow without "bleeding" occurring in the initial phase. Moreover, fluid building materials must have a sufficiently long working time without the setting time being substantially delayed. Otherwise, the same requirements apply as described above for non-fluid building materials.

The building materials according to the invention satisfy these above-mentioned demands to a very high degree.

Apart from the condensation products claimed as additives, other additives known per se can also be added to the building materials according to the invention.

The condensation products claimed as additives are compounds which are generally known from the literature and whose preparation is also described (see Ullmanns Encyclopädie der technischen Chemie (Ullmann's Encyclopaedia of Chemical Technology), vol. 16, p. 109; DE-OS 19 60 616, EP-A-242 495, DE-A-29 05 083).

The building materials were prepared and the data determined according to DIN 4208, Anhydrite binders, March 1984 edition for anhydrite, according to DIN EN 196, Test method for cement, and according to DIN 1168 for β-hemihydrate.

The slump according to DIN 4208/EN 196 is used as a measure of the plasticizing/liquefying action of additives. The slump is the diameter of a circle of a mixture which is obtained when a slump cone with a height of 8 cm, bottom diameter of 10 cm and top diameter of 8 cm, filled with the mixture to be tested, is emptied on to a glass plate and then carefully withdrawn vertically. The mixture then spreads out in the shape of a circle. The ratio of the diameters of the circles of building materials without and with an additive provides information about the liquefying action of the additive. In the case of earth-moist non-fluid building materials, the glass plate is shocked 15 times according to DIN 4208/EN 196 before the diameter is determined.

In a modified form, the plasticizing or liquefying action of the additive can also be determined by measuring the required amount of water, with and without the additive, for a constant slump.

In addition, the trace time is used for assessing the self-levelling properties of building materials. The trace time is understood as meaning the time taken by a trace produced on the surface of the building materials to flow into itself. The trace can be produced e.g. by moving a nail or similar objects over the surface of the mixture. The assessment is made visually.

The invention will be illustrated in greater detail with the aid of the following Examples.

EXAMPLE 1 (ACCORDING TO THE INVENTION)

1 mol of crude dihydroxydiphenyl sulphone is sulphomethylated with 1.2 mol of sodium bisulphite and 2.3 mol of formaldehyde and the product obtained is adjusted to pH 5 with sulphuric acid and sulphur dioxide and postcondensed with 1.5 mol of urea and a further 0.65 mol of formaldehyde. After the addition of monosodium phthalate (approx. 20% by weight, based on the solids content of the condensation product), the pH is adjusted to 7-8 and the product is spray-dried.

This condensation product is added to various building materials, the properties of which are then measured (see Tables).

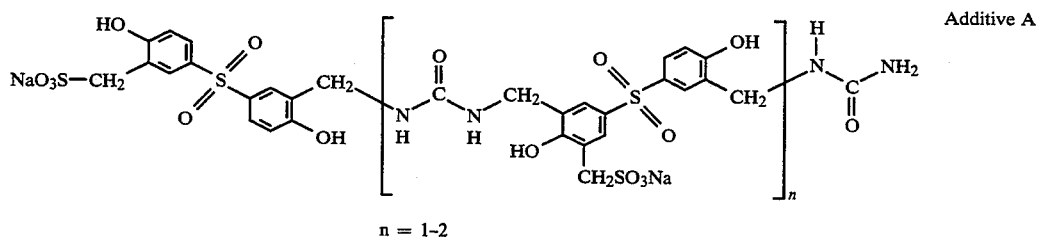

Additive A n = 1-2

EXAMPLE 2 (ACCORDING TO THE INVENTION)

1 mol of an isomeric mixture of ditolyl ethers is sulphonated with 2 mol of sulphuric acid and the resulting mixture of ditolyl ether sulphonic acids, with 1 mol of 4,4'-dihydroxydiphenyl sulphone, is condensed in aqueous solution with 0.93 mol of formaldehyde, neutralized to a pH of approx. 7-9 with sodium hydroxide solution and spray-dried or used as a solution.

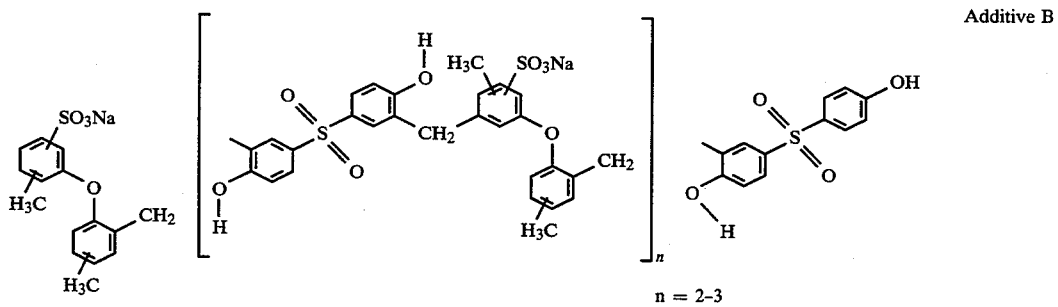

Additive B n = 2-3

EXAMPLE 3 (ACCORDING TO THE INVENTION)

1 mol of naphthalene is sulphonated with 1.36 mol of 100% sulphuric acid and, together with 0.63 mol of 4,4'-dihydroxydiphenyl sulphone, is condensed in aqueous solution with 0.81 mol of formaldehyde. The acid condensation mixture is neutralized to a pH of approx. 7-9 with sodium hydroxide solution and sodium phthalate solution and spray-dried or used as a solution.

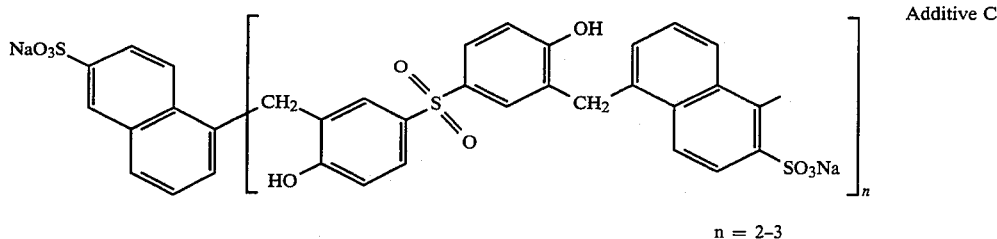

Additive C n = 2–3

EXAMPLE 4 (ACCORDING TO THE INVENTION)

1 mol of phenolsulphonic acid and 3 mol of crude 4,4'-dihydroxydiphenyl sulphone are condensed in aqueous solution at a pH of approx. 8 with 2.4 mol of formaldehyde. The acid condensation mixture is neutralized and adjusted to pH 7–9 with sodium hydroxide solution and sodium phthalate solution and spray-dried or used as an aqueous solution.

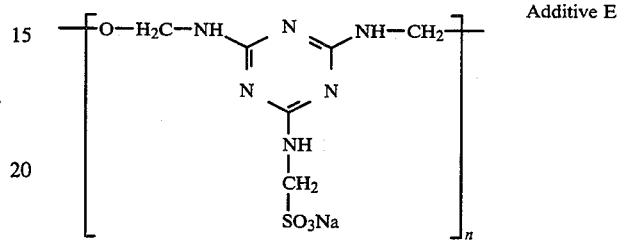

Additive E

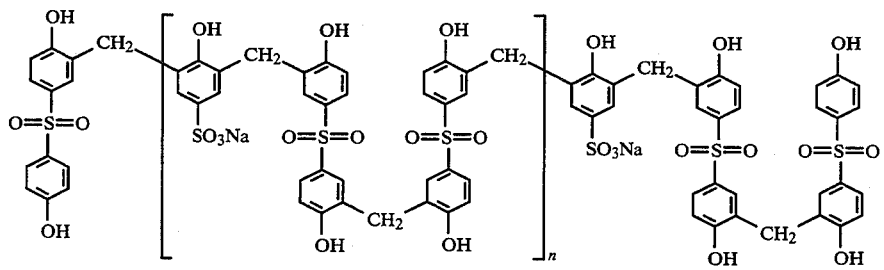

Additive D

EXAMPLE 5 (COMPARATIVE)

2,4,6-Triamino-1,3,5-triazine (melamine) is reacted at pH 9.0 with formaldehyde and sodium hydrogen sulphite. The resulting N-methylol compound is then condensed at pH 6.0 immediately after the addition of a small amount of formamide. The pH of the aqueous solution is adjusted to 9.5 and the product obtained is either spray-dried or used in aqueous solution.

EXAMPLE 6 (COMPARATIVE)

1 mol of naphthalene is sulphonated with 1.36 mol of sulphuric acid for approx 3 hours at approx. 145° C., the sulphonation mixture obtained is condensed for approx. 3 hours with 0.64 mol of formaldehyde at 115° to 117° C., cooled to approx. 80° C. and adjusted to pH 6 to 7 with sodium hydroxide solution, and the reaction product is spray-dried or used as an aqueous solution.

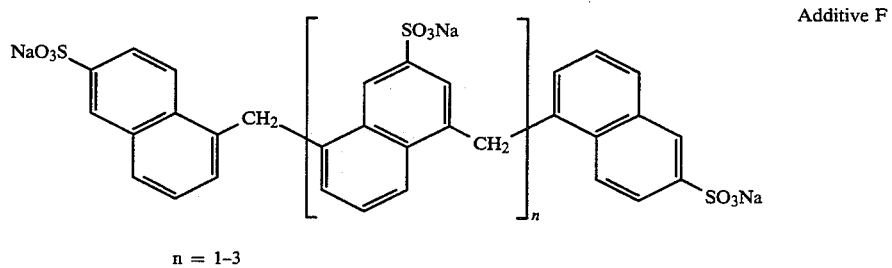

Additive F n = 1–3

TABLE 1

| Building material | Amount of water [ml] | Slump [mm] | Trace time [min] | Air void content [%] | Sedimentation tendency | Setting after 24 h 60% RH, 20° C. |
|---|---|---|---|---|---|---|
| 1 kg of anhydrite[1] 1 kg of sand (0–2 mm) | 520 | 235 | 3 | — | strong | yes |
| + 2.5 g of additive A | 450 | 240 | 10 | — | moderate | yes |
| + 2.5 g of additive B | 450 | 230 | 12 | — | moderate | yes |
| + 2.5 g of additive C | 450 | 240 | 15 | — | weak | yes |

TABLE 1-continued

| Building material | Amount of water [ml] | Slump [mm] | Trace time [min] | Air void content [%] | Sedimentation tendency | Setting after 24 h 60% RH, 20° C. |
|---|---|---|---|---|---|---|
| + 2.5 g of additive D | 350 | 235 | 40 | — | weak | yes |

[1] Synthetic anhydrite binder AB20 according to DIN 4208 with 1.0% by weight of $K_2SO_4$ as activator and a mean iron content of 0.5% by weight of Fe
RH = relative humidity

TABLE 2

| Building material | Amount of water [ml] | Slump [mm] | Trace time [min] | Air void content [%] | Sedimentation tendency | Setting after 24 h 60% RH, 20° C. |
|---|---|---|---|---|---|---|
| 1 kg of anhydrite[1] | 250 | 100 | 0 | — | — | yes |
| + 7 g of additive A | 250 | 155 | 10 | — | — | no |
| + 7 g of additive B | 250 | 145 | 15 | — | — | yes |
| + 7 g of additive C | 250 | 130 | 10 | — | — | yes |
| + 7 g of additive D | 250 | 350 | 60 | — | — | no |

[1] Synthetic anhydrite binder AB20 according to DIN 4208 with 1.0% by weight of $K_2SO_4$ as activator and a mean iron content of 0.5% by weight of Fe
RH = relative humidity

TABLE 3

| Building material | Amount of water [ml] | Slump [mm] | Trace time [min] | Air void content [%] | Sedimentation tendency | Setting after 24 h 60% RH, 20° C. |
|---|---|---|---|---|---|---|
| 1 kg of anhydrite[1] | 250 | 100 | 0 | — | — | yes |
| + 10 g of additive A | 250 | 205 | 12 | — | — | no |
| + 10 g of additive B | 250 | 210 | 20 | — | — | yes |
| + 10 g of additive C | 250 | 190 | 15 | — | — | yes |
| + 5 g of additive D | 250 | 315 | 30 | — | — | no |

[1] Synthetic anhydrite binder AB20 according to DIN 4208 with 1.0% by weight of $K_2SO_4$ as activator and a mean iron content of 0.5% by weight of Fe
RH = relative humidity

TABLE 4

| Building material | Amount of water [ml] | Slump [mm] | Trace time [min] | Air void content [%] | Sedimentation tendency | Setting after 24 h 60% RH, 20° C. |
|---|---|---|---|---|---|---|
| 1 kg of anhydrite[1] 1 kg of sand (0-2 mm) | 470 | 190 | 0 | — | strong | yes |
| + 2.5 g of additive A | 470 | 250 | 10 | — | moderate | yes |
| + 2.5 g of additive B | 470 | 240 | 12 | — | moderate | yes |
| + 2.5 g of additive C | 470 | 250 | 15 | — | weak | yes |
| + 2.5 g of additive D | 470 | 300 | 60 | — | weak | yes |
| + 2.5 g of additive E | 470 | 280 | 40 | — | strong | yes |
| + 2.5 g of additive F | 470 | 210 | 5 | — | moderate | yes |

[1] Synthetic anhydrite binder AB20 according to DIN 4208 with 1.0% by weight of $K_2SO_4$ as activator and a mean iron content of 0.5% by weight of Fe
RH = relative humidity

TABLE 5

| Building material | Amount of water [ml] | Slump [mm] | Working property | Air void content [%] | Sedimentation tendency | Compressive strength [N/mm$^2$] after | |
|---|---|---|---|---|---|---|---|
| | | | | | | 7 d | 28 d |
| 2 kg of anhydrite[1] 7.5 kg of sand (0-8 mm) | 920 | 150 | sticky, water settles out | 4.4 | strong | 20 | 20 |
| + 10 g of A | 840 | 150 | sticky | 4.0 | moderate | 25 | 26 |
| + 10 g of B | 740 | 150 | good | 13.6 | weak | 16 | 22 |
| + 10 g of C | 860 | 150 | good | 6.9 | moderate | 24 | 24 |
| + 10 g of D | 780 | 150 | somewhat sticky | 4.5 | weak | 28 | 30 |
| + 10 g of E | 830 | 150 | sticky, water settles out | — | strong | 28 | 32 |

[1] Synthetic anhydrite binder AB20 according to DIN 4208 with 1.0% by weight of $K_2SO_4$ as activator and a mean iron content of 0.5% by weight of Fe
RH = relative humidity

TABLE 6

| Building material | Amount of water [ml] | Slump [mm] | Working property | Air void content [%] | Sedimentation tendency | Compressive strength [N/mm²] after 7 d | 28 d |
|---|---|---|---|---|---|---|---|
| 2 kg of anhydrite[1)]<br>7.5 kg of sand (0-8 mm) | 900 | 150 | very sticky | 4.3 | — | 19 | 23 |
| + 5.0 g of C | 760 | 150 | good | 6.5 | — | 22 | 27 |
| + 5.0 g of E | | | | | | | |
| + 5.0 g of D | 750 | 150 | good | 6.0 | — | 19 | 24 |
| + 5.0 g of E | | | | | | | |
| + 5.0 g of B | 700 | 150 | good | 7.6 | — | 22 | 25 |
| + 5.0 g of E | | | | | | | |
| + 5.0 g of A | 720 | 150 | good | 6.0 | — | 20 | 23 |
| + 5.0 g of E | | | | | | | |
| + 10 g of E | 820 | 150 | very sticky | 5.4 | — | 24 | 26 |
| + 10 g of F | 730 | 150 | sticky | 7.3 | — | 22 | 22 |

[1)]Synthetic anhydrite binder AB20 according to DIN 4208 with 1.0% by weight of $K_2SO_4$ as activator and a mean iron content of 0.5% by weight of Fe
RH = relative humidity

TABLE 7

| Building material | Amount of water [ml] | Slump [mm] | Working property | Air void content [%] | Sedimentation tendency | Compressive strength [N/mm²] after 7 d | 28 d |
|---|---|---|---|---|---|---|---|
| 4 kg of anhydrite[1)]<br>4 kg of sand (0-2 mm) | 2370 | 245 | 3 | — | strong | | |
| + 6.4 g of E<br>+ 1.6 g of D | 1680 | 245 | 45 | — | moderate | 29 | 42 |
| + 8 g of E<br>+ 2.0 g of D | 1620 | 240 | 50 | — | weak | 29 | 42 |
| + 9.6 g of E<br>+ 5.0 g of D | 1520 | 240 | 60 | — | none | 32 | 46 |
| + 11.2 g of E<br>+ 2.8 g of D | 1440 | 240 | 60 | — | none | 35 | 51 |
| + 12.8 g of E<br>+ 3.2 g of D | 1400 | 240 | 65 | — | none | 32 | 47 |
| + 14.4 g of E<br>+ 3.6 g of D | 1320 | 235 | 70 | — | none | 40 | 55 |
| + 16.0 g of E<br>+ 4.0 g of D | 1250 | 240 | 80 | — | none | 42 | 55 |
| + 10 g of E | 1500 | 240 | 45 | — | moderate | 32 | 39 |

[1)]Synthetic anhydrite binder AB20 according to DIN 4208 with 1.0% by weight of $K_2SO_4$ as activator and a mean iron content of 0.5% by weight of Fe
RH = relative humidity

TABLE 8

| Building material | Amount of water [ml] | Slump [mm] | Setting time according to DIN 1168 Beg. [min] | End [min] | Air void content [%] | Sedimentation tendency | Setting after 24 hours 60% RH, 20° C. |
|---|---|---|---|---|---|---|---|
| 2 kg of plaster ($\beta$-hemihydrate) | 600 | 230 | 5 | 20 | — | — | yes |
| + 5 g of A | 600 | 290 | 22 | 50 | — | — | yes |
| + 5 g of B | 600 | 290 | 6 | 30 | — | yes | |
| + 5 g of C | 600 | 290 | 17 | 45 | — | — | yes |
| + 5 g of D | 600 | 310 | 7 | 20 | — | yes | |
| + 2.5 g of C<br>+ 2.5 g of E | 600 | 330 | 10 | 31 | — | — | yes |
| + 2.5 g of D<br>+ 2.5 g of E | 600 | 370 | 17 | 32 | — | — | yes |
| + 5 g of E | 600 | 300 | 7 | 25 | — | — | yes |
| + 5 g of F | 600 | 280 | 6 | 20 | — | — | yes |

TABLE 9

| Building material | Amount of water [g] | Slump [mm] | Trace time [min] |
|---|---|---|---|
| 1 kg of PZ35 F[2)]<br>1 kg of sand (0-2 mm) | 400 | 135 | 0 |
| + 5 g of A | 400 | 255 | 4 |
| + 5 g of B | 400 | 135 | 2 |
| + 5 g of C | 400 | 165 | 3 |
| + 5 g of D | 400 | 355 | 10 |
| + 5 g of E | 400 | 285 | 0 |
| + 2.5 g of E<br>+ 2.5 g of D | 400 | 245 | 4 |
| + 1.25 g of D<br>+ 3.75 g of E | 400 | 355 | 12 |
| + 5 g of F | 400 | 155 | 0 |

TABLE 9-continued

| Building material | Amount of water [g] | Slump [mm] | Trace time [min] |
|---|---|---|---|
| 1 kg of PZ 35F[2]<br>2.7 kg of standard sand[3] | 550 | not determinable | 0 |
| + 2.5 g of E<br>+ 2.5 g of C | 550 | 210 | 0 |
| + 1.25 g of D<br>+ 3.75 g of E | 550 | 235 | 10 |
| + 5 g of E | 550 | 230 | 3 |

[2] Portland cement PZ 35F according to EN 196
[3] DIN 1164, part 7, Nov. 78

TABLE 10

| Building material | Amount of water [ml] | Slump [mm] | Working property | Air void content [%] | Sedimentation tendency | Compressive strength [N/mm$^2$] after 7 d | 28 d |
|---|---|---|---|---|---|---|---|
| 2 kg of PZ 35F[2]<br>10 kg of sand (0-8 mm) | 1100 | 150 | sticky | 4.9 | strong | 25 | 27 |
| + 10 g of A | 1060 | 150 | sticky | 4.8 | none | 29 | 32 |
| + 10 g of B | 820 | 150 | sticky, frothy | 19.5 | moderate | 8 | 10 |
| + 10 g of C | 1020 | 150 | good | 7.4 | none | 27 | 31 |
| + 10 g of D | 1020 | 150 | good | 5.2 | none | 34 | 36 |
| + 10 g of E | 1050 | 150 | sticky | 5.0 | moderate | 29 | 31 |
| + 5 g of E<br>+ 5 g of C | 1050 | 150 | good | 5.9 | none | 29 | 30 |
| + 8 g of E<br>+ 2 g of D | 1080 | 150 | somewhat sticky | 4.9 | none | 27 | 30 |
| + 10 g of F | 1050 | 150 | sticky, frothy | 7.0 | moderate | 21 | 22 |

[1] Synthetic anhydrite binder AB20 according to DIN 4208 with 1.0% by weight of K$_2$SO$_4$ as activator and a mean iron content of 0.5% by weight of Fe
RH = relative humidity

What is claimed is:

1. Mineral building materials which contain inorganic binders, optionally aggregates and at least one additive, wherein the additives used are condensation products of a) substituted or unsubstituted diphenyl sulphones, b) formaldehyde and c) compounds from the group consisting of mononuclear or polynuclear, substituted or unsubstituted aromatic compounds, acid amides, urea, urea derivatives, substituted or unsubstituted aromatic ethers and amines, further wherein the components a) and c) are used in a molar ratio of 1:5 to 5:1, with formaldehyde in a molar ratio of 1:0.8 to 1:2, based on the component a or c) that is present in the larger molar amount.

2. Mineral building materials according to claim 1, wherein said diphenyl sulphones are selected from diphenyl sulphones of formula I:

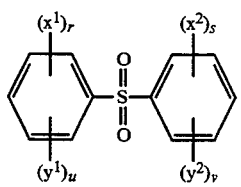
(I)

where
$X^1$ and $X^2$ are identical or different and are selected from H, OH, substituted or unsubstituted $C_1$-$C_6$-alkyl, $C_1$-$C_6$-alkoxy or halogen,
$Y^1$ and $Y^2$ are identical or different and are selected from H, $(CH_2)_n SO_3 Me$ or $SO_3 Me$, where $n=1-5$ and Me=alkali metal, substituted ammonium or unsubstituted ammonium, $r$ and $s$ independently of one another are 0 to 2 and
$u$ and $v$ independently of one another are 0 or 1,
and said compounds are selected from compounds of formulae II to V:

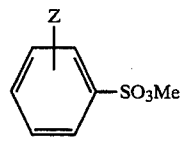
II

Me = alkali metal, substituted ammonium or unsubstituted ammonium
Z = H, OH, or $C_1$—$C_4$-alkyl

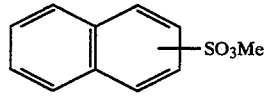
III

Me = alkali metal, substituted ammonium or unsubstituted ammonium

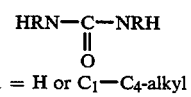
IV

R = H or $C_1$—$C_4$-alkyl

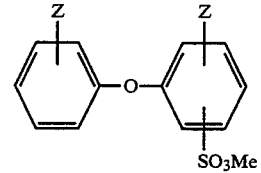
V

Me = alkali metal, substituted ammonium or unsubstituted ammonium
Z = H, OH, or $C_1$—$C_4$-alkyl.

3. Mineral building materials according to claim 2, wherein said diphenyl sulphones are selected from diphenyl sulphones of formula I
where
$X^1$ and $X^2$=OH,
$r$ and $s=1$,
$Y^1$ and $Y^2$=SO$_3$Me or $(CH_2)_n$SO$_3$Me,
where
Me=alkali metal and $n=1$, and
$u$ and $v=1$ or 1,
and said compounds are selected from compounds of formulae VI to IX:

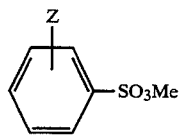
Me = alkali metal
Z = H, OH, or $C_1$—$C_4$-alkyl
VI
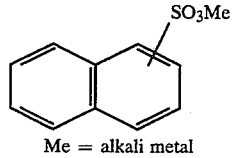
Me = alkali metal
VII
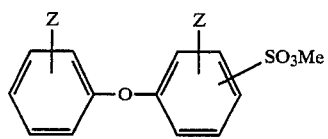
Me = alkali metal
Z = H, OH, or $C_1$—$C_4$-alkyl
VIII
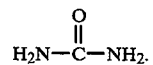
IX
* * * * *

UNITED STATES PATENT AND TRADEMARK OFFICE
CERTIFICATE OF CORRECTION

PATENT NO. : 5,348,582
DATED : Sept. 20, 1994
INVENTOR(S) : Joachim Herzig, et al It is certified that error appears in the above-indentified patent and that said Letters Patent is hereby corrected as shown below:

Column 14, line 66, the words "u and v = 1 or 1," should read --u and v = 0 or 1,--

Signed and Sealed this

Twenty-ninth Day of August, 1995

Attest:

BRUCE LEHMAN

*Attesting Officer*  *Commissioner of Patents and Trademarks*